(12) United States Patent
Wang

(10) Patent No.: US 11,115,913 B2
(45) Date of Patent: Sep. 7, 2021

(54) WIRELESS COMMUNICATION CORE NETWORK AND METHOD FOR ANALYZING USER EQUIPMENT MOBILITY IN THE SAME

(71) Applicant: Institute For Information Industry, Taipei (TW)

(72) Inventor: Tzu-Ya Wang, Taipei (TW)

(73) Assignee: Institute For Information Industry, Taipei (TW)

( * ) Notice: Subject to any disclaimer, the term of this patent is extended or adjusted under 35 U.S.C. 154(b) by 43 days.

(21) Appl. No.: 16/702,483

(22) Filed: Dec. 3, 2019

(65) Prior Publication Data

US 2021/0144629 A1 May 13, 2021

(30) Foreign Application Priority Data

Nov. 13, 2019 (TW) .................................. 108141209

(51) Int. Cl.
| | |
|---|---|
| *H04W 4/00* | (2018.01) |
| *H04W 48/16* | (2009.01) |
| *H04W 76/11* | (2018.01) |
| *H04W 8/08* | (2009.01) |
| *H04W 48/08* | (2009.01) |

(52) U.S. Cl.
CPC ............ *H04W 48/16* (2013.01); *H04W 8/08* (2013.01); *H04W 48/08* (2013.01); *H04W 76/11* (2018.02)

(58) Field of Classification Search
CPC ..... H04W 28/04; H04W 48/16; H04W 48/08; H04W 72/04; H04W 72/042; H04W 76/11; H04W 8/08; H04L 5/007

USPC ........................................................ 370/329
See application file for complete search history.

(56) References Cited

U.S. PATENT DOCUMENTS

| | | | |
|---|---|---|---|
| 2017/0311304 A1 | 10/2017 | Lu | |
| 2018/0262924 A1 | 9/2018 | Dao et al. | |
| 2018/0376384 A1 | 12/2018 | Youn et al. | |
| 2020/0068653 A1* | 2/2020 | Li | H04L 12/1407 |
| 2020/0112907 A1* | 4/2020 | Dao | H04M 15/66 |
| 2020/0229069 A1* | 7/2020 | Chun | H04W 36/0079 |
| 2020/0288296 A1* | 9/2020 | Fiorese | H04L 41/0823 |
| 2020/0296603 A1* | 9/2020 | Suthar | H04L 41/12 |
| 2020/0358689 A1* | 11/2020 | Lee | H04L 43/065 |

(Continued)

OTHER PUBLICATIONS

Office Action to the corresponding Taiwan Patent Application rendered by the Taiwan Intellectual Property Office (TIPO) dated Jul. 17, 2020, 9 pages (including English translation).

*Primary Examiner* — Temica M Beamer
(74) *Attorney, Agent, or Firm* — Skaar Ulbrich Macari, P.A.

(57) ABSTRACT

In a wireless communication core network, an Application Function (AF) make an analysis request for a mobility analytics report of a UE, which includes first UE mobility information of the UE. In the wireless communication core network, a Network Data Analysis Function (NWDAF) obtains an identity of an Access and Mobility Management Function (AMF) serving the UE from a Unified Data Management (UDM), on its own or via a Network Exposure Function (NEF), based on the request. Then, the NWDAF obtains second UE mobility information of the UE from the AMF according to the identity of the AMF, and generates and transmits the mobility analytics report to the AF according to the first and second UE mobility information.

8 Claims, 4 Drawing Sheets

(56) References Cited

U.S. PATENT DOCUMENTS

| | | | | |
|---|---|---|---|---|
| 2020/0359439 A1* | 11/2020 | Qiao | .................... | H04W 40/246 |
| 2020/0396657 A1* | 12/2020 | Feder | .................... | H04W 36/08 |
| 2021/0014141 A1* | 1/2021 | Patil | .................... | H04L 43/065 |
| 2021/0021437 A1* | 1/2021 | Qiao | .................... | H04M 15/66 |
| 2021/0029603 A1* | 1/2021 | Kim | .................... | H04W 60/00 |
| 2021/0029731 A1* | 1/2021 | Kundu | .................... | H04W 16/14 |
| 2021/0058956 A1* | 2/2021 | Chatterjee | .................... | H04W 72/14 |

\* cited by examiner

WIRELESS COMMUNICATION CORE NETWORK AND METHOD FOR ANALYZING USER EQUIPMENT MOBILITY IN THE SAME

PRIORITY

This application claims priority to Taiwan Patent Application No. 108141209 filed on Nov. 13, 2019, which is hereby incorporated by reference in its entirety.

FIELD

Embodiments of the present invention relate to a wireless communication core network and a method for analyzing user equipment (UE) in the same. More specifically, embodiments of the present invention relate to a wireless communication core network and a method for analyzing UE mobility in the same.

BACKGROUND

According to the fifth generation (5G) mobile communication technology, a wireless communication core network provides various services to a UE by its Access and Mobility Management Function (AMF), such as registration management, connection management, reachability management, mobility management, access authentication, access authorization, . . . and others. One AMF usually needs to serve a plurality of UEs, and stores their various mobile information such as user equipment identity (UE ID), user equipment location information, Type Allocation Code (TAC), Frequent mobility re-registration information. Therefore, when an Application Function (AF) in the wireless communication core network requires a Network Data Analysis Function (NWDAF) to provide a mobility analytics report of a certain UE, the NWDAF needs to obtain various mobility information related to the UE from the AMF which is serving the UE to analyze the mobility of the UE, and then generates and transmits the mobility analytics report to the AF according to the analysis result.

However, when receiving a request from the AF, the NWDAF does not know which AMF the UE belongs to, and therefore must contact each AMF in the wireless communication core network one by one to identify which AMF is serving the concerned UE, and then obtain various mobility information related to the UE from the identified AMF. In this case, it is time-consuming and power-consuming because of huge message transmission between NWDAF and unrelated AMFs. In view of this, it is quite important in the art to make the NWDAF efficiently identify the AMF which the currently concerned UE belongs to and obtain its mobility information from the AMF.

SUMMARY

Provided is a wireless communication core network. The wireless communication core network may comprise an Access and Mobility Management Function (AMF), a Unified Data Management (UDM), an Application Function (AF), and a Network Data Analysis Function (NWDAF), which connect to each other. The AMF may be configured to serve at least one user equipment (UE). The UDM may be configured to store an identity of the AMF. The AF may be configured to make an analysis request for a mobility analytics report of the at least one UE, and the analysis request comprises first UE mobility information of the at least one UE. The NWDAF may be configured to: obtain the identity of the AMF from the UDM on its own or via a Network Exposure Function (NEF) according to the analysis request; obtain second UE mobility information of the at least one UE from the AMF according to the identity; and generate and transmit the mobility analytics report to the AF according to the first UE mobility information and the second UE mobility information.

Also provided is a method for analyzing UE mobility in a wireless communication core network. The method may comprise:

making, by an AF, an analysis request, wherein the analysis request requires a mobility analytics report of at least one UE, and the analysis request comprises first UE mobility information of the at least one UE;

obtaining, by the NWDAF, an identity of an AMF from a UDM on its own or via an NEF according to the analysis request;

obtaining, by the NWDAF, second UE mobility information of the at least one UE from the AMF according to the identity; and generating, by the NWDAF, the mobility analytics report according to the first UE mobility information and the second UE mobility information and transmitting the mobility analytics report from the NWDAF to the AF.

In certain embodiments, the NWDAF can obtain the UE ID of a single UE from first UE mobility information of the UE or obtain the UE Group ID of a UE group including a plurality of UEs from first UE mobility information of the UE group, and then transmits the UE ID or the UE Group ID to the UDM either on its own or via the NEF. Because the UDM records all of the correspondence between each AMF in the wireless communication core network and its served UE or UE group, the UDM can provide the identity of the corresponding AMF to the NWDAF based on the received UE ID or the UE Group ID. After obtaining the identity of the specific AMF which the UE or the UE group belongs to, the NWDAF can directly obtain second UE mobility information of the UE or the UE group from the serving AMF, and then analyze the UE or the UE group according to the first UE mobility information and the second UE mobility information. Next, the NWDAF can generate and transmit the mobility analytics report required by the AF to the AF according to the analysis result.

In summary, by obtaining the AMF which the UE or the UE group belongs to from the UDM, the NWDAF does not need to contact each AMF in the wireless communication core network one by one, and therefore the message transmissions between the NWDAF and unrelated AMFs can be avoided. Thereby, time consumption and power consumption can be saved. Consequently, the NWDAF can efficiently identify the AMF which the currently concerned UE or UE group belongs to, and obtain the desired mobility information from it.

What described above is not intended to limit the present invention, but merely outlines the technical problems that the present invention can solve, the technical means that can be adopted and the technical effects that can be achieved so that a person having ordinary skill in the art can preliminarily understand the present invention. According to the attached drawings and the description of the following embodiments, a person having ordinary skill in the art can further understand the details of various embodiments of the present invention.

BRIEF DESCRIPTION OF THE DRAWINGS

The drawings are provided for describing various embodiments, in which.

DETAILED DESCRIPTION

Figure 1:
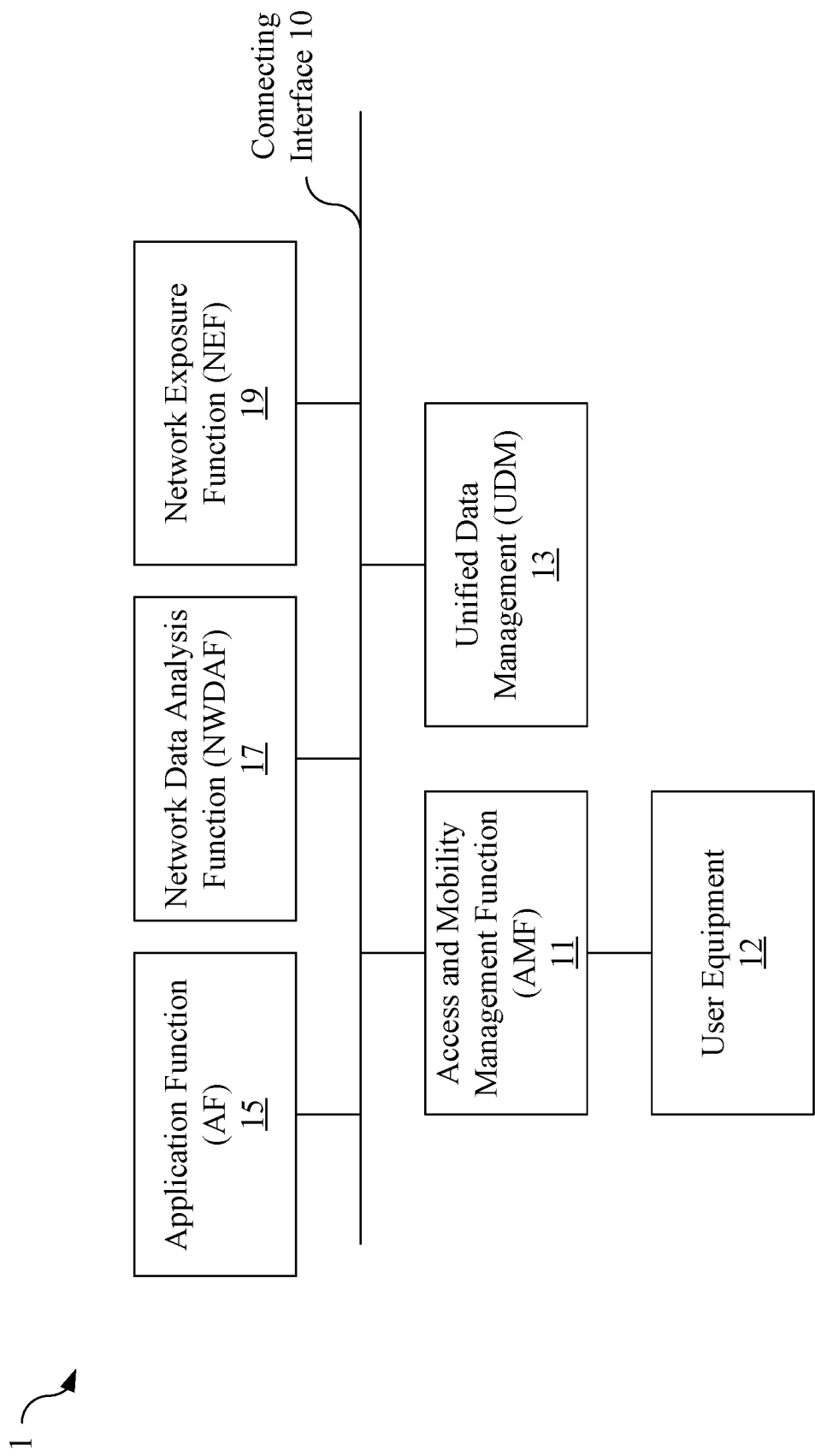
FIG. 1 illustrates a wireless communication core network according to some embodiments.

In the following description, the present invention will be explained with reference to certain example embodiments thereof. However, these example embodiments are not intended to limit the present invention to be implemented in the operations, examples, embodiments, environment, applications, structures, processes, or steps described in these example embodiments. In the attached drawings, elements unrelated to the present invention are omitted from depiction but may be implied in the drawings; and dimensions of elements and proportional relationships among individual elements in the attached drawings are only exemplary examples but not intended to limit the present invention. Unless stated particularly, same (or similar) element symbols may correspond to same (or similar) elements in the following description. Unless stated particularly, the number of each element described hereinafter may be one or more while being implementable.

Terms used in the present disclosure are only for the purpose of describing embodiments and are not intended to limit the invention. Singular forms "a," "an," and "the" are intended to include the plural forms as well, unless the context clearly indicates otherwise. Terms such as "comprises" and/or "comprising" specify the presence of stated features, integers, steps, operations, elements, and/or components, but do not preclude the presence of one or more other features, integers, steps, operations, elements, components, and/or combinations thereof. The term "and/or" includes any and all combinations of one or more associated listed items.

FIG. 1 illustrates a wireless communication core network according to some embodiments. The content of FIG. 1 is shown only for the purpose of illustrating embodiments of the present invention and is not intended to limit the present invention. Referring to FIG. 1, the wireless communication core network 1 is suitable for the fifth generation (5G) mobile communication technology and can comprise various functions under the 5G mobile communication technology. However, for ease of explanation, functions unrelated to the embodiments of the present invention will be omitted from this disclosure and the drawings.

The wireless communication core network 1 may basically comprise an AMF 11, a UE 12, a UDM 13, an AF 15, an NWDAF 17, and an NEF 19, which connect to each other. Each of the functions comprised in the wireless communication core network 1 can be implemented by one or more physical computers connected to each other or by one or more virtual machines (VMs) connected to each other. Each virtual machine is an emulator of a physical computer, which runs on a physical computer, and can function as the physical computer by software and the hardware resources of the physical computer. Each physical computer can basically comprise a processor, a storage, an input/output interface, a network interface, etc.

In detail, the processor may be a variety of microprocessors or microcontrollers with signal processing functions. A microprocessor or microcontroller is a programmable special integrated circuit that has the functions of calculation, storage, output/input, etc., and can receive and process various coding instructions, thereby performing various logic calculations and arithmetic operations, and outputting the corresponding calculated result. The storage may comprise various storage units provided in a general computing device/computer. The storage device may comprise first-level memory (also referred to as main memory or internal memory) directly connected to the processor, second-level memory (also referred to as external memory or auxiliary memory) not directly connected to the processor, and third-level memory (a memory that can be directly inserted or removed from a computer). In a physical computer, the storage can store various calculation results of the processor in the physical computer and various data input by the input/output interface. The input/output interface can comprise various input/output elements provided in a general computing device/computer to receive data from the outside and output data to the outside. For example, but not limited to: mouse, trackball, trackpad, keyboard, scanner, microphone, user interface, screen, touch screen, projector, and the like. The network interface may comprise at least one physical network interface card provided in a general computing device/computer as an interconnection between the physical computer and a network (private network or public network). According to different requirements, the network interface allows the physical computer to communicate and exchange data with other electronic devices in the network by means of wired access or wireless access.

Through a connecting interface 10, the AMF 11, the UDM 13, the AF 15, the NWDAF 17, and the NEF 19 can be connected to each other and communicate with each other. The connecting interface 10 can adopt a protocol conforming to the 5G communication standard, such as, but not limited to, the Hypertext Transfer Protocol (HTTP) and its subsequent protocols. For example, the connecting interface 10 may be an HTTP interface conforming to Hypertext Transfer Protocol version 2 (HTTP/2).

AMF 11 may provide various services to UE 12, such as registration management, connection management, reachability management, mobility management, access authentication, access authorization . . . , and others. The AMF 11 may store second UE mobility information of the UE 12, and the second UE mobility information may comprise, for example but not limited to: UE ID, UE location information, Type Allocation Code (TAC), Frequent mobility re-registration information. Under the 5G mobile communication technology, the AMF 11 can be connected to the UE 12 through the called N1 interface, and connected to the Next Generation-Radio Access Network (NG-RAN), i.e., a "base station" (not shown), through the called N2 interface, and the NG-RAN can be connected to the UE 12 through the called Uu interface.

The UE 12 may be various electronic devices with networking functions. For example, the UE 12 may be a mobile phone, a tablet computer, a notebook computer, various Internet of Things (IoT) products, but not limited to those. In this disclosure, the UE 12 may be regarded as a single UE or a UE group including a plurality of UEs. In the case where the UE 12 is a single UE, there is a UE ID corresponding to the UE 12. In the case where the UE 12 is a UE group, there is a UE Group ID corresponding to the UE 12.

The UDM 13 may comprise a Unified Data Repository (UDR) used to store the management data related to UEs in the wireless communication core network 1. For example, the UDR may store the UE ID of a single UE or the UE Group ID of a UE group, and store the identity of its serving AMF, so as to record the correspondence between each AMF and its served UE or UE group in the wireless communication core network. The UDM may also comprise a Front End used to access data stored in the UDR.

The AF 15 can provide various application services to a client or a UE (e.g., the UE 12), such as providing the client or the UE with a mobility analytics report or other related information of the UE. The AF 15 can obtain and store first UE mobility information of the UE 12, and make an analysis request which comprises the first UE mobility information to ask the NWDAF 17 to provide a mobility analytics report of the UE 12. For example, the first UE mobility information may comprise, for example but not limited to: UE ID, application identity (application ID), and UE trajectory information which includes the several piece of location information and the corresponding timestamp information of a UE.

The NWDAF 17 may provide various network analysis information for the request of other functions in the wireless communication core network 1. For example, the NWDAF 17 may perform a mobility analysis of the UE 12 according to the request made by the AF 15, and then provide the mobility analytics report to the AF 15.

The NEF 19 is trusted by the wireless communication core network 1, so it is allowed to access data stored in certain functions (e.g., the UDM 13) in the wireless communication core network 1. In addition, the NEF 19 may also decide whether to allow other untrusted function(s) to access some information of the UE 12 or to change the behavior of the UE 12.

Figure 2:
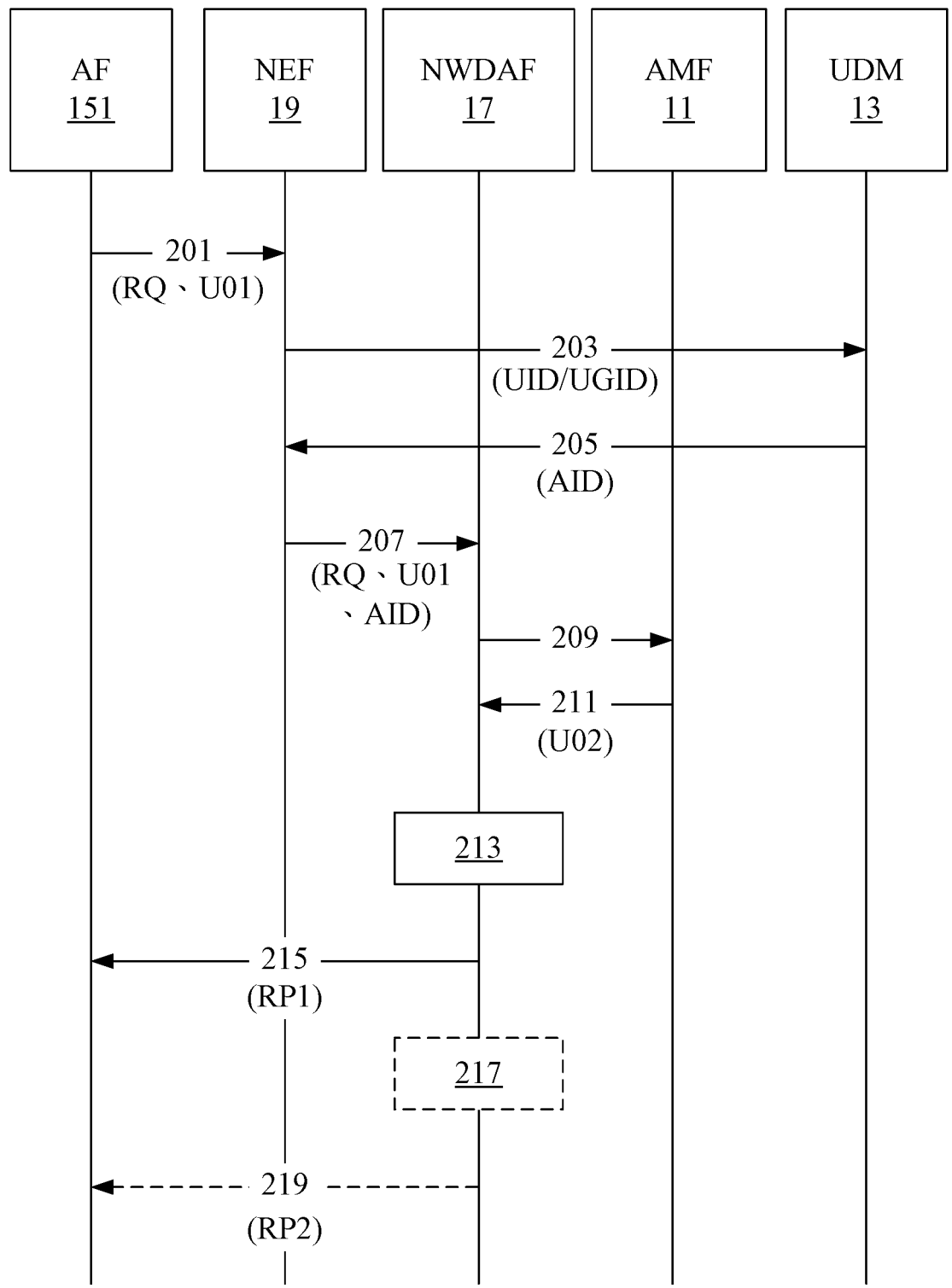
FIG. 2 is a schematic view illustrating how the wireless communication core network of FIG. 1 analyzes UE mobility according to some embodiments.

FIG. 2 is a schematic view illustrating how the wireless communication core network 1 of FIG. 1 analyze UE mobility according to some embodiments, wherein the AF 15 is an untrusted AF 151. The content of FIG. 2 is shown only for the purpose of illustrating embodiments of the present invention and is not intended to limit the present invention.

Referring to FIG. 2, since the untrusted AF 151 is not trusted by the wireless communication core network 1, the NEF 19 trusted by the wireless communication core network 1 is necessary for the untrusted AF 151 to obtain information of the UE 12 (one UE or one UE group) from the AMF 11 which is serving the UE 12. Therefore, first, the untrusted AF 151 transmits an analysis request RQ to the NEF 19 (labeled as operation 201). The analysis request RQ may be an NWDAF Analytics-Info Request Message or an NWDAF Analytics-Subscription Subscribe Message, which comprises the first UE mobility information U01 of the UE 12. In some embodiments, the NWDAF Analytics-Info Request Message or the NWDAF Analytics-Subscription Subscribe Message may be used to request the NWDAF 17 to analyze a single UE and provide an associated mobility analysis report; and in such case, the first UE mobility information U01 may comprise the UE ID UID of the UE 12. In some embodiments, the NWDAF Analytics-Info Request Message or the NWDAF Analytics-Subscription Subscribe Message may be used to request the NWDAF to analyze a UE group and provide an associated mobility analysis report; and in such case, the first UE mobility information U01 may comprise the UE group ID UGID of the UE12.

After receiving the aforesaid analysis request RQ, the NEF 19 may transmit a UE Context Message GET Request Message carrying the UE ID UID or the UE group ID UGID to the UDM 13, to ask the UDM 13 to provide the identity AID of the serving AMF 11 which the UE 12 belongs to (labeled as operation 203).

Next, the UDM 13 returns a UE Context-Message GET Response Message carrying the identity AID of the serving AMF 11 which the UE 12 belongs to according to the UE ID UID or the UE group ID UGID to the NEF 19 (labeled as operation 205). Since the UDM 13 records all of the correspondence between each AMF 11 and its served UE or UE group in the wireless communication core network, the UDM can provide the identity AID of the corresponding AMF 11 to the NEF 19 according to the received UE ID UID or the UE group ID UGID.

After the NEF 19 receives the identity AID of the corresponding AMF 11, it may transmit the identity AID of the corresponding AMF 11 and the analysis request RQ to the NWDAF 17 (labeled as operation 207).

After the NWDAF 17 receives the aforesaid analysis request RQ (including the first UE mobility information U01 of the UE 12 and the identity AID of the corresponding AMF 11), the NWDAF 17 transmits an AMF Event-Exposure Subscribe Message to the corresponding AMF 11 according to the identity AID, to ask the AMF 11 to provide the second UE mobility information U02 of the UE 12 (labeled as operation 209). Then, the AMF 11 may return an AMF Event-Exposure Notify Message carrying the second UE mobility information U02 to the NWDAF 17 (labeled as operation 211).

After obtaining the second UE mobility information U02 of the UE 12, the NWDAF 17 may analyze the UE mobility of the UE 12 according to the first UE mobility information U01 and the second UE mobility information U02, and then generate a mobility analytics report RP1 according to the analysis result (labeled as operation 213). Next, the NWDAF 17 may transmit an NWDAF Analytics-Info Response Message or an NWDAF Analytics-Subscription Notify Message to the untrusted AF 151 (labeled as operation 215), to provide the mobility analytics report RP1 to the untrusted AF 151.

In some embodiments, optionally, after the NWDAF 17 transmits the mobility analytics report RP1 to the untrusted AF 151, the NWDAF 17 may generate an updated mobility analytics report RP2 after a period of time (labeled as operation 217), and transmit the updated mobility analysis report RP2 to the untrusted AF 151 (labeled as operation 219). The NWDAF 17 may again transmit an NWDAF Analytics-Subscription Notify Message to the untrusted AF 151 to provide the updated mobility analytics report RP2 to the untrusted AF 151.

Figure 3:
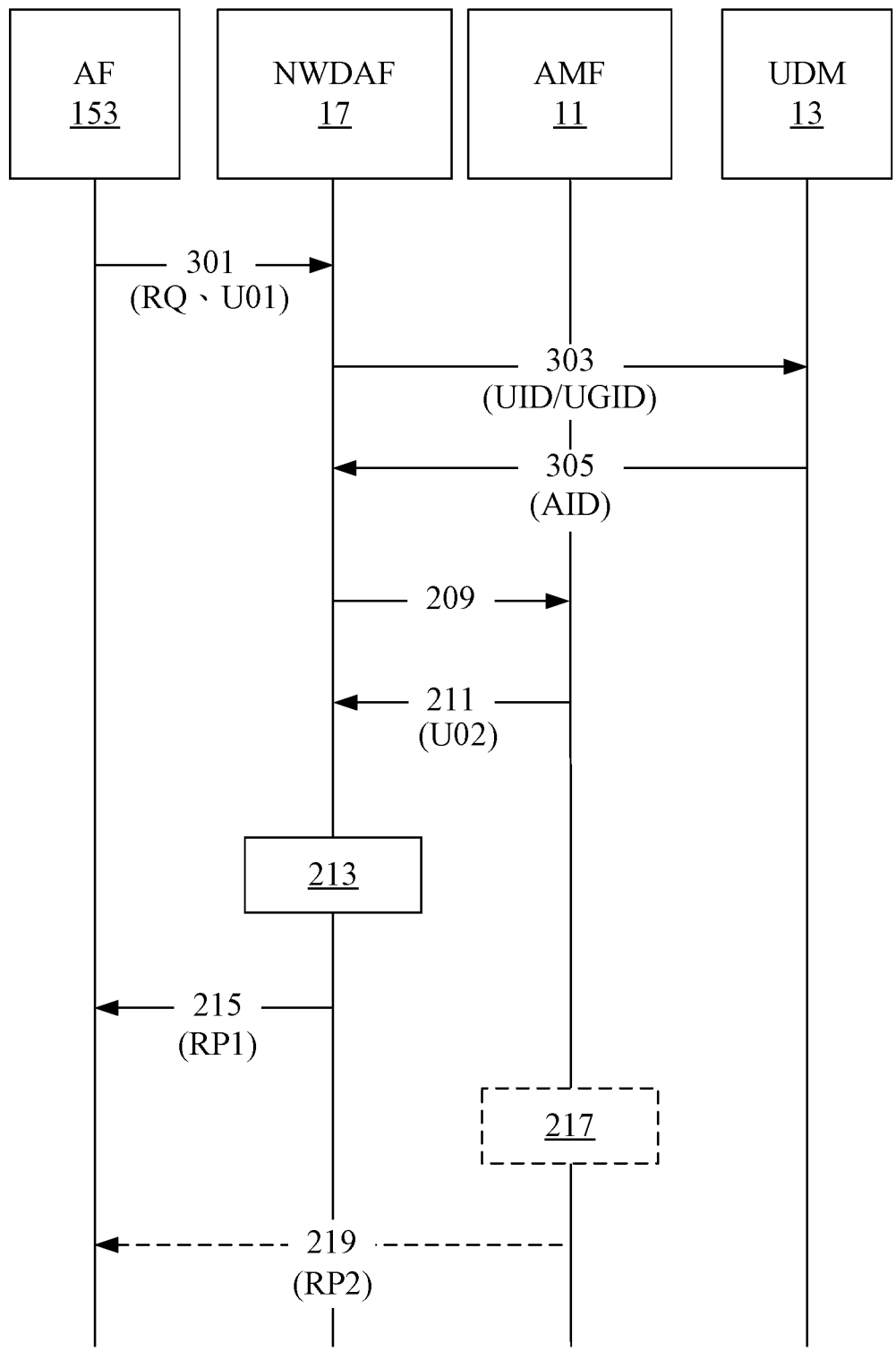
FIG. 3 is a schematic view illustrating how the wireless communication core network of FIG. 1 analyzes UE mobility under different conditions according to some other embodiments.

FIG. 3 is a schematic view illustrating how the wireless communication core network of FIG. 1 analyze UE mobility under different conditions according to some other embodiments, wherein the AF 15 is a trusted AF 153. The content of FIG. 3 is shown only for the purpose of illustrating embodiments of the present invention and is not intended to limit the present invention.

Referring to FIG. 3, since the trusted AF 153 is trusted by the wireless communication core network 1, the trusted AF 153 is allowed to obtain information of the UE 12 (one UE or UE group) from its serving AMF 11 without assistance of the NEF 19. Therefore, the trusted AF 153 may directly transmit an analysis request RQ to the NWDAF 17 (labeled as operation 301). Similarly, the analysis request RQ may be an NWDAF Analytics-Info Response Message or an NWDAF Analytics-Subscription Notify Message, which comprise the first UE mobility information U01 of the UE 12. In some embodiments, the NWDAF Analytics-Info Response Message or the NWDAF Analytics-Subscription Notify Message may be used to request the NWDAF 17 to analyze a single UE and provide an associated mobility analysis report; and in such case, the first UE mobility information U01 may comprise the UE ID UID of the UE 12. In some embodiments, the NWDAF Analytics-Info Request Message or the NWDAF Analytics-Subscription Subscribe Message may be used to request the NWDAF to analyze a UE group and provide an associated mobility analysis report; and in such case, the first UE mobility information U01 may comprise the UE group ID UGID of the UEs 12

After receiving the aforesaid analysis request RQ, the NEF 19 may transmit a UE Context Message GET Request Message carrying the UE ID UID or the UE group ID UGID to the UDM 13, to ask the UDM 13 to provide the identity AID of the serving AMF 11 which the UE 12 belongs to (labeled as operation 303).

Next, the UDM 13 returns a UE Context-Message GET Response Message carrying the identity AID of the serving AMF 11 which the UE 12 belongs to according to the UE ID UID or the UE group ID UGID to the NWDAF 17 (labeled as operation 305). Since the UDM 13 records all of the correspondence between each AMF 11 and its served UE or UE group, the UDM may provide the identity AID of the corresponding AMF 11 to the NWDAF 17 according to the received UE ID UID or the UE group ID UGID.

After receiving the identity AID of the AMF 11, the NWDAF 17 may perform subsequent operations 209, 211, 213, 215 in sequence to complete the analysis of UE mobility of the UE 12 and provide the mobility analytics report RP1 to the trusted AF 153. In some embodiments, the NWDAF 17 may also optionally perform operations 217 and 219 to provide the updated mobility analytics report to the trusted AF 153. The operations 209, 211, 213, 215, 217, and 219 shown in FIG. 3 are the same as those shown in FIG. 2 respectively, and thus the details thereof will not be described again.

Figure 4:
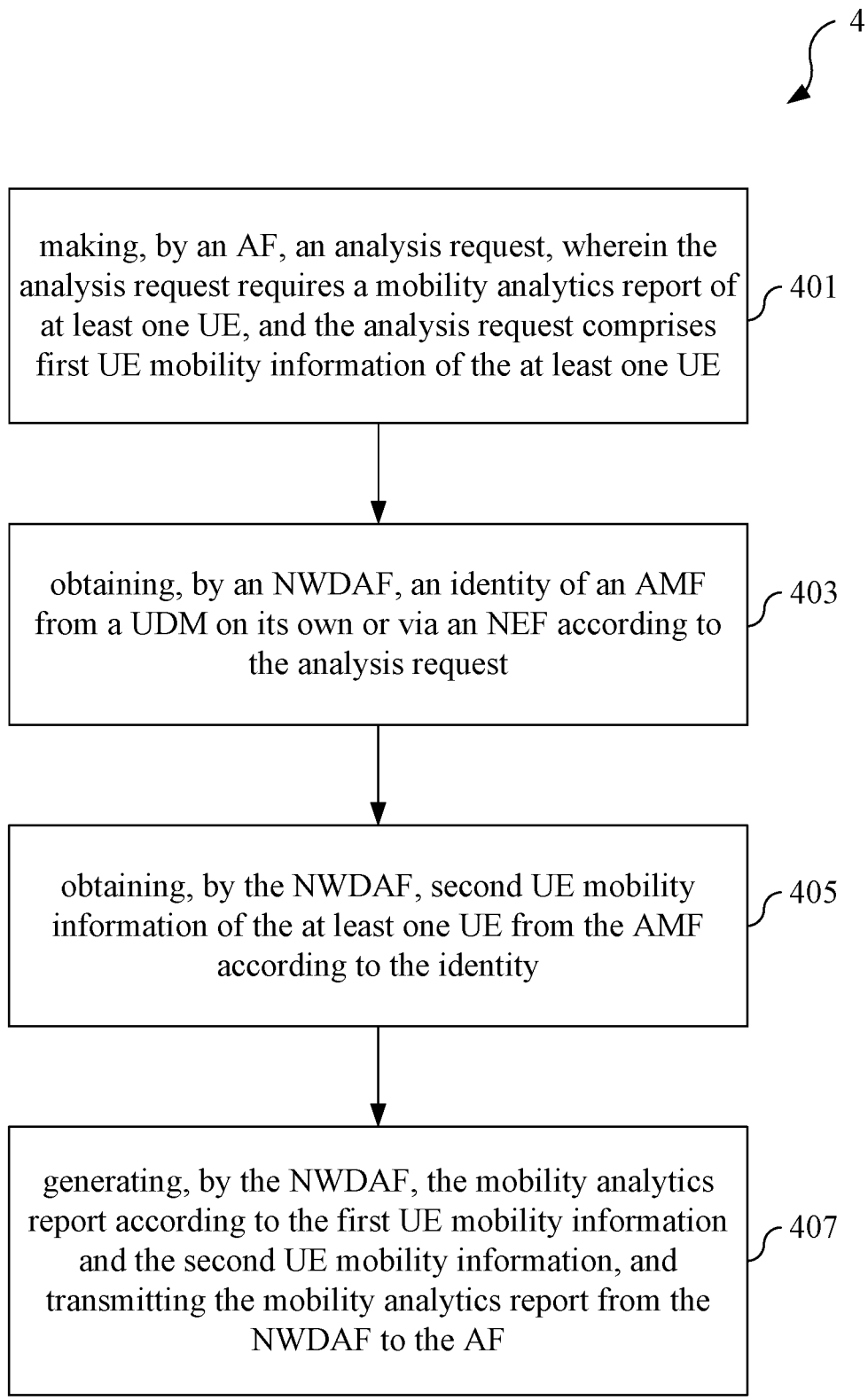
FIG. 4 illustrates a method for analyzing UE mobility in a wireless communication core network according to some embodiments.

FIG. 4 illustrates a method for analyzing UE mobility in a wireless communication core network according to some embodiments. The content of in FIG. 4 is shown only for the purpose of illustrating embodiments of the present invention and is not intended to limit the present invention.

Referring to FIG. 4, a method 4 for analyzing UE mobility may comprises the following steps:

making, by an AF, an analysis request, wherein the analysis request requires a mobility analytics report of at least one UE, and the analysis request comprises first UE mobility information of the at least one UE (labeled as step 401);

obtaining, by an NWDAF, an identity of an AMF from a UDM on its own or via an NEF according to the analysis request (labeled as step 403);

obtaining, by the NWDAF, second UE mobility information of the at least one UE from the AMF according to the identity (labeled as step 405); and generating, by the NWDAF, the mobility analytics report according to the first UE mobility information and the second UE mobility information, and transmitting the mobility analytics report from the NWDAF to the AF (labeled as step 407).

In some embodiments, when the AF is an untrusted AF, the NWDAF obtains the identity of the AMF from the UDM via the NEF.

In some embodiments, when the AF is a trusted AF, the NWDAF obtains the identity of the AMF from the UDM on its own.

In some embodiments, the NWDAF connects to the AMF, the UDM, and the AF through a Hypertext Transfer Protocol Interface.

All embodiments of the method 4 essentially correspond to those of the wireless communication core network 1. In addition to the above-mentioned embodiments of method 4, there may be other embodiments of method 4 which are not specifically described above. However, these other embodiments of method 4 shall be appreciated by a person having ordinary skill in the art based on the above description of the wireless communication core network 1, and thus will not be further described herein.

The above disclosure is related to the detailed technical contents and inventive features thereof for some embodiments of the present invention, but such disclosure is not to limit the present invention. A person having ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A wireless communication core network, comprising:
an access and mobility management function (AMF), being configured to serve at least one user equipment (UE);
a unified data management (UDM), being configured to store an identity of the AMF;
an application Function (AF), being configured to make an analysis request for a mobility analytics report of the at least one UE, wherein the analysis request comprises first UE mobility information of the at least one UE; and
a network data analysis function (NWDAF), being connected to the AMF, the UDM, and the AF, and being configured to:
obtain the identity of the AMF from the UDM on its own or via a network exposure function (NEF) according to the analysis request;
obtain second UE mobility information of the at least one UE from the AMF according to the identity; and
generate and transmit the mobility analytics report to the AF according to the first UE mobility information and the second UE mobility information.

2. The wireless communication core network of claim 1, wherein when the AF is an untrusted AF, the NWDAF obtains the identity of the AMF from the UDM via the NEF.

3. The wireless communication core network of claim 1, wherein when the AF is a trusted AF, the NWDAF obtains the identity of the AMF from the UDM on its own.

4. The wireless communication core network of claim 1, wherein the NWDAF connects to the AMF, the UDM, and the AF through a Hypertext Transfer Protocol Interface.

5. A method for analyzing User Equipment (UE) mobility in a wireless communication core network, comprising:
making, by an application Function (AF), an analysis request, wherein the analysis request requires a mobility analytics report of at least one UE, and the analysis request comprises first UE mobility information of the at least one UE;

obtaining, by a network data analysis function (NWDAF), an identity of an access and mobility management function (AMF) from a unified data management (UDM) on its own or via a network exposure function (NEF) according to the analysis request;

obtaining, by the NWDAF, second UE mobility information of the at least one UE from the AMF according to the identity; and generating, by the NWDAF, the mobility analytics report according to the first UE mobility information and the second UE mobility information, and transmitting the mobility analytics report from the NWDAF to the AF.

6. The method of claim 5, wherein when the AF is an untrusted AF, the NWDAF obtains the identity of the AMF from the UDM via the NEF.

7. The method of claim 5, wherein when the AF is a trusted AF, the NWDAF obtains the identity of the AMF from the UDM on its own.

8. The method of claim 5, wherein the NWDAF connects to the AMF, the UDM, and the AF through a Hypertext Transfer Protocol Interface.

* * * * *